US012647183B2

(12) United States Patent (10) Patent No.: US 12,647,183 B2
Kim et al. (45) Date of Patent: Jun. 2, 2026

(54) REMOTE CONTROL DEVICE AND CONTROL METHOD THEREOF

(71) Applicant: SAMSUNG ELECTRONICS CO., LTD., Suwon-si (KR)

(72) Inventors: Dongwook Kim, Suwon-si (KR); Byuksun Kim, Suwon-si (KR); Jungseop Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 189 days.

(21) Appl. No.: 18/735,885

(22) Filed: Jun. 6, 2024

(65) Prior Publication Data

US 2024/0322905 A1 Sep. 26, 2024

Related U.S. Application Data

(63) Continuation of application No. PCT/KR2023/000859, filed on Jan. 18, 2023.

(30) Foreign Application Priority Data

Jan. 25, 2022 (KR) ........................ 10-2022-0011056

(51) Int. Cl.
H04B 10/00 (2013.01)
H04B 10/114 (2013.01)
H04J 14/00 (2006.01)

(52) U.S. Cl.
CPC ..... H04B 10/1149 (2013.01); H04B 10/1143 (2013.01)

(58) Field of Classification Search
CPC ............ G08C 2201/00; G08C 2201/60; G08C 2201/63; G08C 2201/70; G08C 2201/90;
(Continued)

(56) References Cited

U.S. PATENT DOCUMENTS 6,769,129 B1 * 7/2004 Perlman ........... H04N 21/42204
725/80
9,319,734 B2 4/2016 Hong et al.
(Continued)

FOREIGN PATENT DOCUMENTS

KR 10-2000-0021007 A 4/2000
KR 10-2003-0033727 A 5/2003
(Continued)

OTHER PUBLICATIONS

International Search Report (PCT/ISA/210) issued on Apr. 25, 2023 by the International Searching Authority in International Patent Application No. PCT/KR2023/000859.
(Continued)

*Primary Examiner* — Daniel G Dobson
(74) *Attorney, Agent, or Firm* — Sughrue Mion, PLLC

(57) ABSTRACT

A remote control device configured to control an electronic device including: a plurality of input keys; a signal transmitter; and a processor configured to: identify a time interval between a first radio signal and a second radio signal based on a length of the first radio signal, and based on one of the plurality of input keys being consecutively selected, control the signal transmitter to repeatedly output the second radio signal corresponding to the selected input key according to the identified time interval, where the first radio signal is configured to control an external electronic device communicating with the electronic device based on the second radio signal received from the remote control device.

20 Claims, 11 Drawing Sheets

(58) Field of Classification Search
CPC ........ G08C 23/00; G08C 23/04; H04B 10/11; H04B 10/114; H04B 10/1141; H04B 10/1143
See application file for complete search history.

(56) References Cited

U.S. PATENT DOCUMENTS

| | | | |
|---|---|---|---|
| 9,407,949 B2 | 8/2016 | Kim | |
| 10,347,120 B2 | 7/2019 | Kim et al. | |
| 11,227,485 B2 | 1/2022 | Jang | |
| 11,228,797 B2 | 1/2022 | Kim et al. | |
| 11,509,341 B2 | 11/2022 | Gilson | |
| 2004/0160338 A1* | 8/2004 | Maxson | G08C 17/00 340/12.22 |
| 2015/0279208 A1 | 10/2015 | Li | |
| 2020/0273324 A1* | 8/2020 | Jang | G08C 19/12 |

FOREIGN PATENT DOCUMENTS

| | | | |
|---|---|---|---|
| KR | 10-0651927 B1 | 12/2006 | |
| KR | 10-0901705 B1 | 6/2009 | |
| KR | 10-2011-0130934 A | 12/2011 | |
| KR | 10-2013-0000652 A | 1/2013 | |
| KR | 10-1433710 B1 | 8/2014 | |
| KR | 10-1506510 B1 | 3/2015 | |
| KR | 10-2017-0045596 A | 4/2017 | |
| KR | 10-1789225 B1 | 11/2017 | |
| KR | 10-2018-0098823 A | 9/2018 | |
| KR | 10-2034590 B1 | 10/2019 | |
| KR | 10-2020-0037567 A | 4/2020 | |
| KR | 10-2020-0104658 A | 9/2020 | |
| KR | 10-2021-0027919 A | 3/2021 | |

OTHER PUBLICATIONS

Written Opinion (PCT/ISA/237) issued on Apr. 25, 2023 by the International Searching Authority in International Patent Application No. PCT/KR2023/000859.

* cited by examiner

100

<u>100</u>

REMOTE CONTROL DEVICE AND CONTROL METHOD THEREOF

CROSS REFERENCE TO RELATED APPLICATION(S)

This application is a continuation of International Application No. PCT/KR2023/000859, filed on Jan. 18, 2023, in the Korean Intellectual Property Receiving Office, which is based on and claims priority to Korean Patent Application No. 10-2022-0011056, filed on Jan. 25, 2022, in the Korean Intellectual Property Office, the disclosures of which are incorporated by reference herein in their entireties.

BACKGROUND

1. Field

The disclosure relates to a remote control device and a control method thereof, and more particularly, to a remote control device that outputs a radio signal corresponding to consecutive selection of an input key, and a control method thereof.

2. Description of Related Art

In order to control a TV in an environment wherein a TV and a set-top box were used together, a remote control for a TV was used, and for controlling the set-top box, a remote control for a set-top box had to be used.

For preventing such inconvenience, some TVs provided a function of controlling a set-top box with a TV remote control by transmitting a radio signal for controlling the set-top box to the set-top box based on a radio signal received from the remote control.

In this case, if an interference phenomenon of a radio signal transmitted by the remote control and a radio signal transmitted by the TV occurs, the set-top box may not perform an operation properly, and thus the TV received a radio signal from the remote control, and after a specific time passed, transmitted a radio signal for controlling the set-top box to the set-top box.

Meanwhile, in case an input key of the TV remote control is consecutively selected, the TV should repeatedly receive a radio signal from the remote control at a short interval, and repeatedly transmit a radio signal to the set-top box, and in this process, the TV should secure a specific time every time before transmitting a radio signal to the set-top box. Thus, the set-top box could not perform a function corresponding to the input key of the remote control that was consecutively selected fast.

SUMMARY

Aspects of the disclosure will be set forth in part in the description which follows and, in part, will be apparent from the description, or may be learned by practice of the presented embodiments.

According to an aspect of the disclosure, a remote control device configured to control an electronic device may include: a plurality of input keys; a signal transmitter; and a processor configured to: identify a time interval between a first radio signal and a second radio signal based on a length of the first radio signal, and based on one of the plurality of input keys being consecutively selected, control the signal transmitter to repeatedly output the second radio signal corresponding to the selected input key according to the identified time interval, where the first radio signal is configured to control an external electronic device communicating with the electronic device based on the second radio signal received from the remote control device.

The identified time interval may be longer than the length of the first radio signal.

The processor may be further configured to: based on the one of the plurality of input keys being consecutively selected, control the signal transmitter to output a third radio signal corresponding to the selected input key, and then repeatedly output the second radio signal corresponding to the selected input key based on the identified time interval.

The processor may be further configured to: control the signal transmitter to output the third radio signal including input key data corresponding to the selected input key based on a first protocol, and then output the second radio signal including input key data corresponding to the selected input key based on a second protocol.

A length of a radio signal corresponding to a bit constituting the input key data in the second protocol may be shorter than a length of a radio signal corresponding to the bit constituting the input key data in the first protocol.

The processor may be further configured to: based on the one of the plurality of input keys being consecutively selected, control the signal transmitter to output the third radio signal corresponding to the selected input key, output the second radio signal after a predetermined time interval from when the third radio signal was output, and repeatedly output the second radio signal according to the identified time interval.

A carrier frequency of the second radio signal may be different from a carrier frequency of the first radio signal.

The remote control device may further include a signal receiver, where the processor is further configured to receive information on the length of the first radio signal through the signal receiver.

According to an aspect of the disclosure, a control method of a remote control device controlling an electronic device may include: identifying a time interval between a first radio signal and a second radio signal based on a length of the first radio signal; and based on one of a plurality of input keys of the remote control device being consecutively selected, repeatedly outputting the second radio signal corresponding to the selected input key according to the identified time interval, where the first radio signal is configured to control an external electronic device based on the second radio signal received from the remote control device.

The identified time interval may be longer than the length of the first radio signal.

The repeatedly outputting the second radio signal may include: based on the one of the plurality of input keys being consecutively selected, outputting a third radio signal corresponding to the selected input key, and then repeatedly outputting the second radio signal corresponding to the selected input key based on the identified time interval.

The repeatedly outputting the second radio signal may further include: outputting the third radio signal including input key data corresponding to the selected input key based on a first protocol, and then outputting the second radio signal including input key data corresponding to the selected input key based on a second protocol.

A length of a radio signal corresponding to a bit constituting the input key data in the second protocol may be shorter than a length of a radio signal corresponding to the bit constituting the input key data in the first protocol.

The repeatedly outputting the second radio signal may further include: based on the one of the plurality of input keys being consecutively selected, outputting the third radio signal corresponding to the selected input key, outputting the second radio signal after a predetermined time interval from when the third radio signal was output, and then repeatedly outputting the second radio signal according to the identified time interval.

A carrier frequency of the second radio signal may be different from a carrier frequency of the first radio signal.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
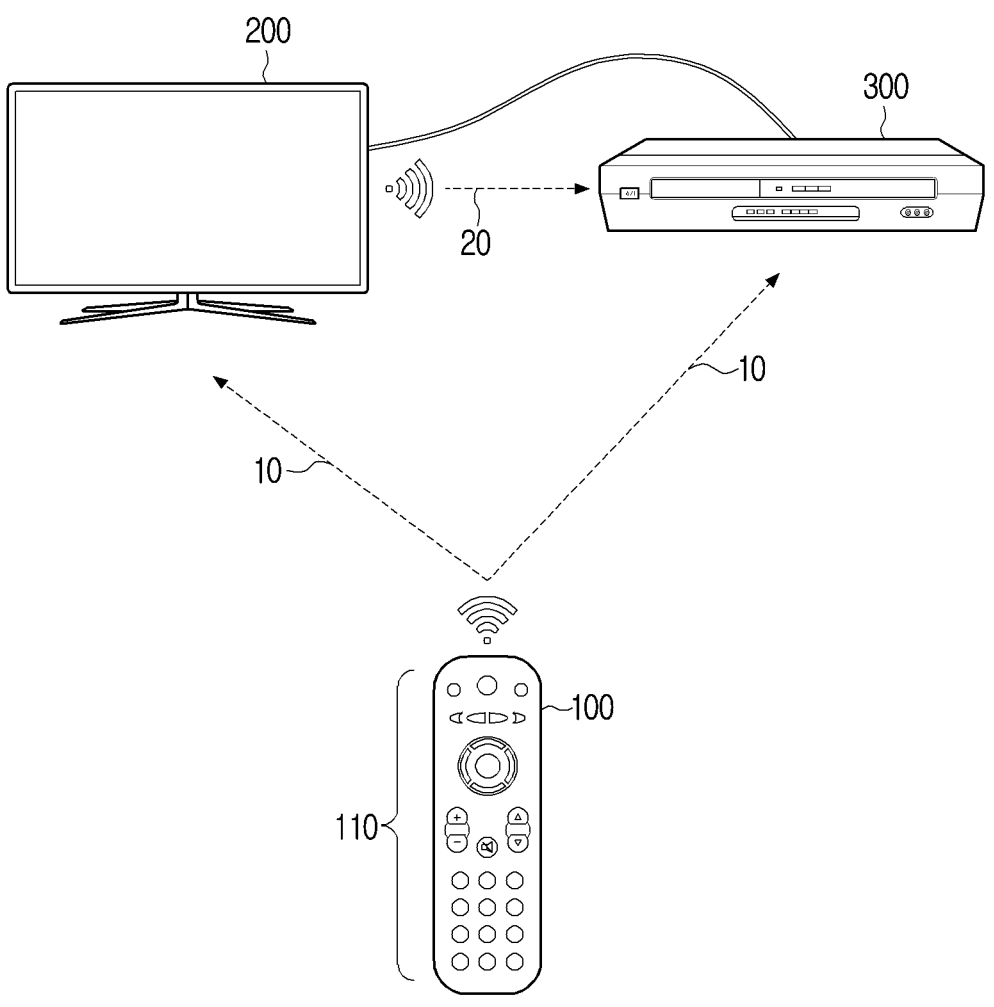
FIG. 1 is a diagram for illustrating a remote control device according to an embodiment of the disclosure.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. It is to be understood that singular forms include plural referents unless the context clearly dictates otherwise. The terms including technical or scientific terms used in the disclosure may have the same meanings as generally understood by those skilled in the art.

Also, in describing the disclosure, in case it is determined that detailed explanation of related known functions or components may unnecessarily confuse the gist of the disclosure, the detailed explanation will be omitted.

In addition, the embodiments below may be modified in various different forms, and the scope of the technical idea of the disclosure is not limited to the embodiments below. Rather, these embodiments are provided to make the disclosure more sufficient and complete, and to fully convey the technical idea of the disclosure to those skilled in the art.

Further, the terms used in the disclosure are used to explain exemplary embodiments of the disclosure, and are not intended to limit the scope of the other embodiments. In addition, singular expressions include plural expressions, unless defined obviously differently in the context.

Also, in the disclosure, expressions such as "have," "may have," "include," "may include," comprise" and "may comprise" should be construed as denoting that there are such characteristics (e.g.: elements such as numerical values, functions, operations, and components), and the terms are not intended to exclude the existence of additional characteristics.

In addition, in the disclosure, the expressions "A or B," "at least one of A or B," "one or more of A or B," "at least one of A and/or B," or "one or more of A and/or B" and the like may include all possible combinations of the listed items. For example, "A or B," "at least one of A and B," or "at least one of A or B" may refer to all of the following cases: (1) including at least one A, (2) including at least one B, or (3) including at least one A and at least one B.

Further, the expressions "first," "second," and the like used in the disclosure may be used to describe various elements regardless of any order and/or degree of importance. Also, such expressions are used only to distinguish one element from another element, and are not intended to limit the elements.

The description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

In contrast, the description that one element (e.g.: a first element) is "directly coupled" or "directly connected" to another element (e.g.: a second element) can be interpreted to mean that still another element (e.g.: a third element) does not exist between the one element and the another element.

Also, the expression "configured to" used in the disclosure may be interchangeably used with other expressions such as "suitable for," "having the capacity to," "designed to," "adapted to," "made to" and "capable of," depending on cases. The term "configured to" may not necessarily mean that a device is "specifically designed to" in terms of hardware.

Under some circumstances, the expression "a device configured to" may mean that the device "is capable of" performing an operation together with another device or component. For example, the phrase "a processor configured to perform A, B, and C" may mean a dedicated processor (e.g.: an embedded processor) for performing the corresponding operations, or a generic-purpose processor (e.g.: a CPU or an application processor) that can perform the corresponding operations by executing one or more software programs stored in a memory device.

Also, in the embodiments of the disclosure, 'a module' or 'a part' performs at least one function or operation, and may be implemented as hardware or software, or implemented as a combination of hardware and software. In addition, a plurality of 'modules' or 'parts' may be integrated into at least one module and implemented as at least one processor, except 'a module' or 'a part' that needs to be implemented as specific hardware.

Various elements and areas in drawings were illustrated schematically. Accordingly, the technical idea of the disclosure is not limited by the relative sizes or intervals illustrated in the accompanying drawings.

Hereinafter, embodiments according to the disclosure will be described in detail with reference to the accompanying drawings.

FIG. 1 is a diagram for illustrating a remote control device according to an embodiment of the disclosure.

A remote control device 100 may control an electronic device 200. If a user selects one of a plurality of input keys 110, the remote control device 100 may transmit a radio signal 10 corresponding to the elected input key to the electronic device 200.

The electronic device 200 may perform various functions based on the radio signal 10 received from the remote control device 100.

For example, in case the electronic device 200 is a TV, the plurality of input keys 110 of the remote control device 100 may include a power key that turns on or turns off the power of the electronic device 200, a volume key that changes the volume level, a channel key that changes the channel, etc. Accordingly, the electronic device 200 may turn on or turn off the power, change the channel, or change the volume level based on the radio signal 10 received from the remote control device 100.

The electronic device 200 may receive data from an external electronic device 300, and perform various functions based on the received data. For example, in case the external electronic device 300 is a set-top box, the electronic device 200 may reproduce various contents based on the data received from the external electronic device 300. In this case, the contents may include contents provided through over-the-top (OTT) media services or broadcasting contents provided by operators of various broadcasting services through broadcasting channels, etc.

For this, the electronic device 200 may receive data from the external electronic device 300 through a communication interface. In this case, the communication interface may include a wired communication interface such as an HDMI interface or a wireless communication interface such as a Wi-Fi module, a Bluetooth module, etc.

When the electronic device 200 receives a radio signal 10 corresponding to a selected input key, the electronic device 200 may transmit a radio signal 20 for controlling the external electronic device 300 to the external electronic device 300 based on the received radio signal 10.

Then, the external electronic device 300 may transmit data for the electronic device 200 to perform a function corresponding to the selected input key to the electronic device 200 based on the radio signal 20 received from the electronic device 200.

For example, when the electronic device 200 reproduces a content based on the data received from the external electronic device 300, in cases a volume key changing the volume level is selected among the plurality of input keys 110 of the remote control device 100 by the user, the electronic device 200 may receive a radio signal 10 corresponding to the volume key, and transmit a radio signal 20 for controlling the external electronic device 300 such that the volume level of the content is changed to the external electronic device 300.

Then, the external electronic device 300 may transmit data for reproducing the content of which volume level has been changed to the electronic device 200 based on the radio signal 20 received from the electronic device 200. Accordingly, the electronic device 200 may reproduce the content provided from the external electronic device 300 by changing the volume level.

The radio signals 10, 20 may include a code for identifying a device to be controlled (referred to as an address code hereinafter), and a code for identifying a function that the device to be controlled should perform (referred to as a data code hereinafter).

Accordingly, when a radio signal is received, the electronic device 200 and the external electronic device 300 may perform a function based on the received radio signal on the basis of the address code and the data code included in the received radio signal.

For example, in case the radio signals 10, 20 are infrared signals, and the electronic device 200 and the external electronic device 300 are in the same space, the external electronic device 300 may receive the radio signal 10 transmitted from the remote control device 100. In this case, the external electronic device 300 may identify that the device to be controlled for the radio signal 10 is not the external electronic device 300 based on the address code included in the radio signal 10, and may not perform a function based on the radio signal 10.

In contrast, in case the external electronic device 300 receives the radio signal 20 transmitted from the electronic device 200, the external electronic device 300 may identify that the device to be controlled for the radio signal 20 is the external electronic device 300 based on the address code included in the radio signal 20, and may perform a function corresponding to the data code included in the radio signal 20.

In case the user consecutively selects one of the plurality of input keys 110 of the remote control device 100, the remote control device 100 may repeatedly transmit a radio signal 10 corresponding to the selected input key to the electronic device 200.

Then, the electronic device 200 may repeatedly transmit a radio signal 20 for controlling the external electronic device 300 based on the radio signal 10 that was repeatedly received.

In this case, if the external electronic device 300 receives the radio signal 10 transmitted from the remote control device 100 and the radio signal 20 transmitted from the electronic device 200 together, the external electronic device 300 may not correctly identify the address code or the data code of the radio signal 20 due to an interference phenomenon between the radio signals 10, 20. That is, if an interference phenomenon between the radio signals 10, 20 occurs, the external electronic device 300 may not perform a function based on the received radio signal 20 properly.

Accordingly, in case one of the plurality of input keys 110 is consecutively selected, the remote control device 100 according to an embodiment of the disclosure may repeatedly transmit a radio signal 10 corresponding to the selected input key to the electronic device 200 based on information on the length of the radio signal 20 for controlling the external electronic device 300.

As can be seen above, according to an embodiment of the disclosure, even if one of the plurality of input keys 110 of the remote control device 100 is consecutively selected, the external electronic device 300 does not receive a radio signal 10 output by the remote control device 100 and a radio signal 20 output by the electronic device 200 together, and thus an interference phenomenon between the radio signals does not occur, and accordingly, the external electronic device 300 can perform the function based on the radio signal 20 consecutively received from the electronic device 200 correctly.

Figure 2:
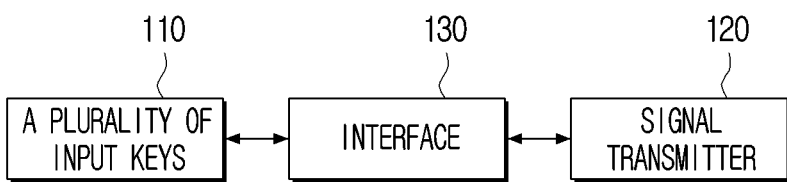
FIG. 2 is a block diagram for illustrating a configuration of a remote control device according to an embodiment of the disclosure.

FIG. 2 is a block diagram for illustrating a configuration of a remote control device according to an embodiment of the disclosure.

Referring to FIG. 2, the remote control device 100 includes a plurality of input keys 110, a signal transmitter 120, and a processor 130.

The plurality of input keys 110 are components for the remote control device 100 to receive a user instruction. For this, the plurality of input keys 110 may be implemented as physical buttons or a touch panel, etc. As an example, the plurality of input keys 110 may include a power key, a channel key, a volume key, etc. for controlling an external device.

The signal transmitter 120 is a component for transmitting a radio signal to an external device. For this, the signal transmitter 120 may be implemented as communication circuitry including at least one electronic element that can output infrared rays. As an example, the signal transmitter 120 may include one or more infrared light emitting diodes. Accordingly, the signal transmitter 120 may transmit an infrared radio signal to an external device.

The processor 130 may be electrically connected with the plurality of input keys 110 and the signal transmitter 120, and control overall operations and functions of the remote control device 100.

For this, the processor 130 may include a central processing unit (CPU), or an application processor (AP), and may execute one or more software programs stored in the memory according to one or more instructions stored in the memory of the remote control device 100.

First, the processor 130 may detect a user input selecting one of the plurality of input keys 110. Then, the processor 130 may control the signal transmitter 120 to output a radio signal corresponding to the input key selected by the user input.

For this, the memory of the remote control device 100 may include information on the address codes and the data codes corresponding to each of the plurality of input keys 110. Accordingly, if a user input selecting one of the plurality of input keys 110 is detected, the processor 130 may control the signal transmitter 120 to output a radio signal including the address code and the data code corresponding to the selected input key based on the information stored in the memory.

The electronic device 200 may receive a radio signal output through the signal transmitter 120 of the remote control device 100. Then, the electronic device 200 may transmit a radio signal for controlling the external electronic device 300 to the external electronic device 300 based on the received radio signal.

For this, the electronic device 200 may include a signal receiver for receiving a radio signal. Here, the signal receiver may be implemented as communication circuitry including at least one electronic element that detects an infrared light of a specific wavelength and generates an electric signal. As an example, the signal receiver may include an IR photodiode. Accordingly, the electronic device 200 may receive an infrared radio signal output through the signal transmitter 120 of the remote control device 100 through the signal receiver.

Also, the electronic device 200 may include a signal transmitter for transmitting a radio signal. Accordingly, the electronic device 200 may transmit an infrared radio signal to the external electronic device 300 through the signal transmitter.

The electronic device 200 may receive a radio signal output through the signal transmitter 120 of the remote control device 100 through the signal receiver, and identify a device to be controlled and a selected input key based on an address code and a data code of the received radio signal. For this, the memory of the electronic device 200 may store information on an address code corresponding to the electronic device 200 and information on data codes corresponding to each of the plurality of input keys 110.

Then, if the device to be controlled is identified as the electronic device 200, the electronic device 200 may identify whether control of the external electronic device 300 would be necessary for performing a function corresponding to the selected input key based on the identified selected input key.

For example, in case the selected input key is the power key turning on or turning off the power of the electronic device 200, as the electronic device 200 can perform turning-on and turning-off of the power of the electronic device 200 solely, the electronic device 200 may identify that control of the external electronic device 300 would not be necessary for performing the function corresponding to the selected input key.

In contrast, in case the selected input key is the channel key changing the channel or the volume key changing the volume, and the electronic device 200 is reproducing a content based on a signal received from the external electronic device 300, control of the external electronic device 300 would be necessary for changing the broadcasting channel that is reproducing the content, or changing the volume level of the content, and thus the electronic device 200 may identify that control of the external electronic device 300 would be necessary for performing the function corresponding to the selected input key.

Then, if the electronic device 200 identified that the device to be controlled is the electronic device 200, and the function corresponding to the selected input key needs control of the external electronic device 300, the electronic device 200 may output a radio signal used for controlling the external electronic device 300 through the signal transmitter based on the received radio signal.

For this, the memory of the electronic device 200 may include information on an address code indicating that the device to be controlled is the external electronic device 300, and data codes corresponding to each of the plurality of functions of the external electronic device 300.

Accordingly, if the electronic device 200 identified that the device to be controlled is the electronic device 200, and the function corresponding to the selected input key needs control of the external electronic device 300, the electronic device 200 may output a radio signal including an address code indicating that the device to be controlled is the external electronic device 300 and a data code corresponding to the function through the signal transmitter of the electronic device 200 based on the information stored in the memory of the electronic device 200.

The external electronic device 300 may receive the radio signal output through the signal transmitter of the electronic device 200 through the signal receiver.

Here, the signal receiver of the external electronic device 300 may be implemented as communication circuitry consisting of at least one electronic element that detects an infrared light of a specific wavelength and generates an electric signal. As an example, the signal receiver of the external electronic device 300 may include an IR photodiode. Accordingly, the external electronic device 300 may receive an infrared radio signal output through the signal transmitter of the electronic device 200 through the signal receiver.

Then, the external electronic device 300 may perform a function corresponding to the received radio signal based on the address code and the data code included in the received radio signal.

The external electronic device 300 may identify whether the device to be controlled is the external electronic device 300 based on the address code included in the received radio signal.

Then, if the external electronic device 300 identified that the device to be controlled is the external electronic device 300, the external electronic device 300 may perform a function corresponding to the data code included in the received radio signal. For example, in case the function corresponding to the data code is change of a volume level of a content, the external electronic device 300 may transmit data for reproducing the content of which volume level has been changed to the electronic device 200.

For this, the memory of the external electronic device 300 may include information on an address code corresponding to the external electronic device 300 and data codes corresponding to each of the plurality of functions of the external electronic device 300.

Like this, in case control of the external electronic device 300 is necessary for performing a function corresponding to a selected input key of the remote control device 100, the electronic device 200 may transmit a radio signal to the external electronic device 300, and perform the function corresponding to the selected input key based on data received from the The processor 130 may identify a time interval among the second radio signals based on information on the length of the first radio signal.

Here, the first radio signal may be a radio signal used for the electronic device 200 to control the external electronic device 300 performing communication with the electronic device 200 based on the second radio signal received from the remote control device 100.

Also, the second radio signal may mean a radio signal corresponding to a selected input key that is repeatedly output through the signal transmitter 120, when one of the plurality of input keys 110 of the remote control device 100 was consecutively selected.

The processor 130 may identify a time interval among the second radio signals that are repeatedly output based on information on the length of the first radio signal. Here, the time interval among the second radio signals may mean the time that passed from a time point when output of the previous second radio signal was finished to a time point when output of the next second radio signal starts among the second radio signals that are repeatedly output.

The identified time interval among the second radio signals may be longer than the length of the first radio signal.

When the second radio signals were repeatedly output during the times longer than the length of the first radio signal, the processor 130 may identify the shortest time during which interference between the first radio signal and the second radio signal does not occur as the time interval among the second radio signals.

For this, the memory of the remote control device 100 may store information on the length of the first radio signal. Then, the processor 130 may identify a time longer than the length of the first radio signal as the time interval among the second radio signals based on the information on the length of the first radio signal stored in the memory.

Also, the remote control device 100 may further include a signal receiver. Then, the processor 130 may receive information on the length of the first radio signal from the electronic device 200 through the signal receiver. Accordingly, the processor 130 may identify a time longer than the length of the first radio signal as the time interval among the second radio signals based on the information on the length of the first radio signal received from the electronic device 200.

Then, if one of the plurality of input keys 110 is consecutively selected, the processor 130 may control the signal transmitter 120 to repeatedly output the second radio signal corresponding to the selected input key based on the identified time interval.

The processor 130 may identify the time during which a user input selecting one of the plurality of input keys 110 lasts. Then, in case the identified time is greater than or equal to a predetermined time, the processor 130 may identify that the input key was consecutively selected.

Then, the processor 130 may control the signal transmitter 120 to output the second radio signal corresponding to the input key identified to have been consecutively selected by a predetermined time interval.

Hereinafter, the first radio signal and the second radio signal will be described in detail through FIG. 3.

Figure 3:
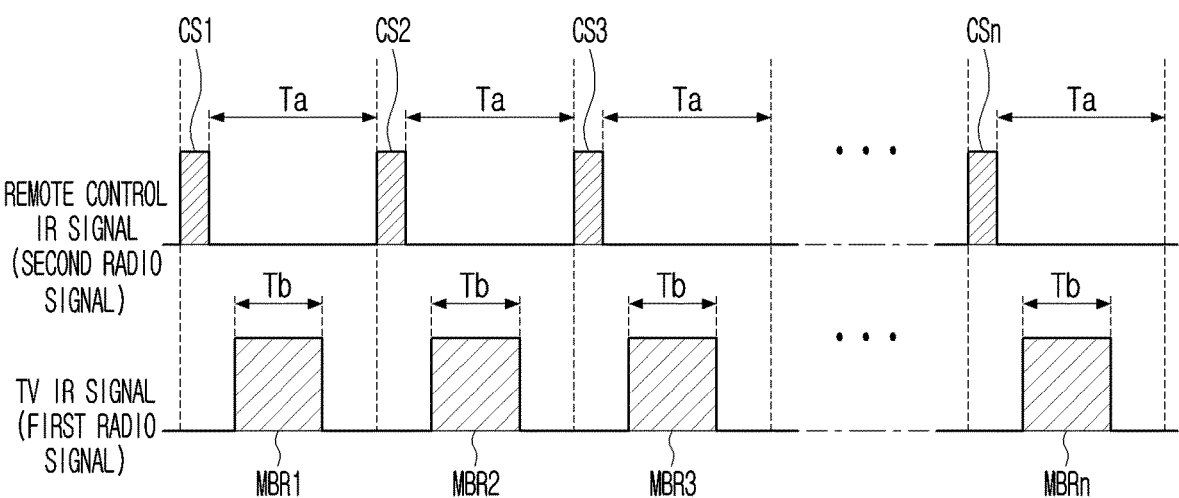
FIG. 3 is a diagram for illustrating a first radio signal and a second radio signal according to an embodiment of the disclosure.

FIG. 3 is a diagram for illustrating a first radio signal and a second radio signal according to an embodiment of the disclosure.

Referring to FIG. 3, if one of the plurality of input keys 110 is consecutively selected, the processor 130 may control the signal transmitter 120 to repeatedly output a plurality of second radio signals CS1, CS2, CS3, . . . , CSn corresponding to the selected input key based on the identified time interval Ta.

Then, when the electronic device 200 receives the second radio signals, the electronic device 200 may repeatedly transmit a plurality of first radio signals MBR1, MBR2, MBR3, . . . , MBRn to the external electronic device 300 based on the received second radio . . . signals.

Here, the time interval Ta among the second radio signals that are repeatedly output may be longer than the lengths Tb of the plurality of first radio signals MBR1, MBR2, MBR3, . . . , MBRn. As an example, in case the lengths Tb of the plurality of first radio signals MBR1, MBR2, MBR3, . . . , MBRn are 100 ms, the interval Ta among the second radio signals may be 150 ms.

That is, the plurality of first radio signals MBR1, MBR2, MBR3, . . . , MBRn are output within the time interval Ta among the plurality of second radio signals CS1, CS2, CS3, . . . , CSn, and thus a case wherein the external electronic apparatus 300 receives the plurality of first radio signals MBR1, MBR2, MBR3, . . . , MBRn and the plurality of second radio signals CS1, CS2, CS3, . . . , CSn together can be prevented.

As described above, the remote control device 100 according to an embodiment of the disclosure may output the second radio signal corresponding to a consecutively selected input key by a time interval wherein interference with the first radio signal does not occur. Accordingly, the external electronic device 300 can perform an operation based on the first radio signal repeatedly received from the electronic device 200 correctly and swiftly.

According to an embodiment of the disclosure, if one of the plurality of input keys 110 is consecutively selected, the processor 130 may output a third radio signal corresponding to the selected input key, and control the transmitter 120 to repeatedly output a second radio signal corresponding to the selected input key based on an identified time interval.

If a user input selecting one of the plurality of input keys 110 is detected, the processor 130 may control the transmitter 120 to output the third radio signal corresponding to the selected input key.

Then, in case the user input selecting the selected input key lasts for greater than or equal to the predetermined time, the processor 130 may identify that the input key was consecutively selected, and repeatedly output the second radio signal corresponding to the selected input key.

In this case, the processor 130 may control the signal transmitter 120 to output the third radio signal including input key data corresponding to the selected input key based on the first protocol, and output the second radio signal including input key data corresponding to the selected input key based on the second protocol.

Here, the length of a radio signal corresponding to one bit constituting the input key data in the second protocol may be shorter than the length of a radio signal corresponding to one bit constituting the input key data in the first protocol.

Accordingly, even if the second radio signal and the third radio signal include the same data, the length of the second radio signal may be shorter than the length of the third radio signal.

Figure 4:
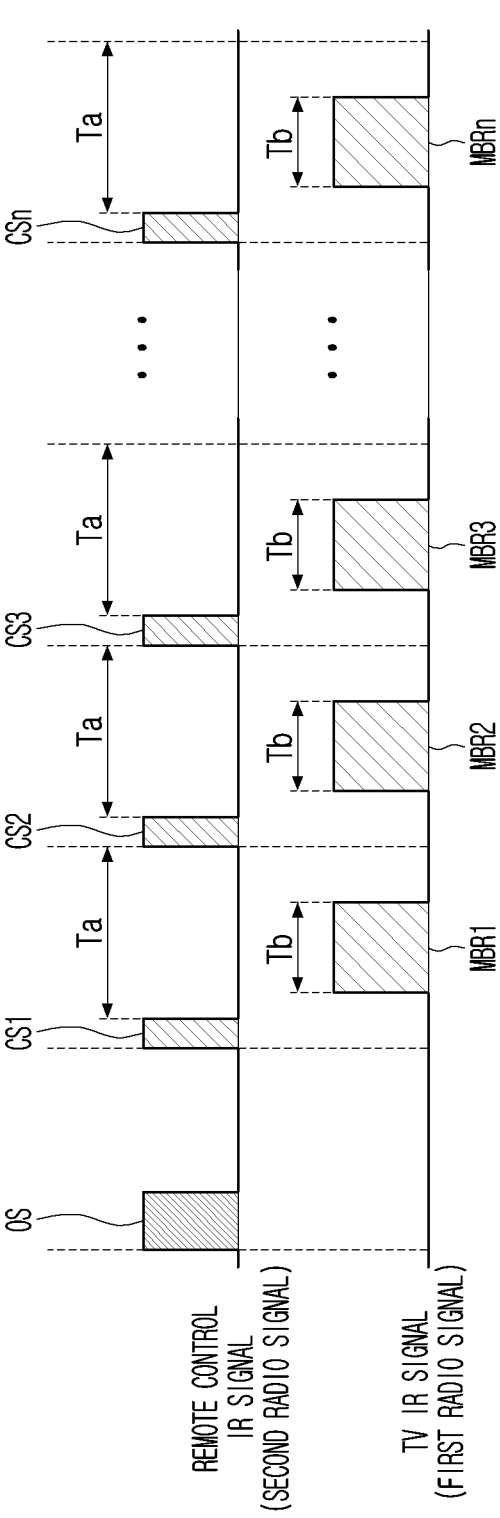
FIG. 4 is a diagram for illustrating a first radio signal and a second radio signal according to an embodiment of the disclosure.

For example, as in FIG. 4, if one of the plurality of input keys 110 is consecutively selected, the processor 130 may control the transmitter 120 to output a third radio signal OS corresponding to the selected input key, and repeatedly output the plurality of second radio signals CS1, CS2, CS3, . . . , CSn corresponding to the selected input key based on the identified time interval T.

Here, the third radio signal OS may be a radio signal output based on an NEC protocol.

Figure 5A:
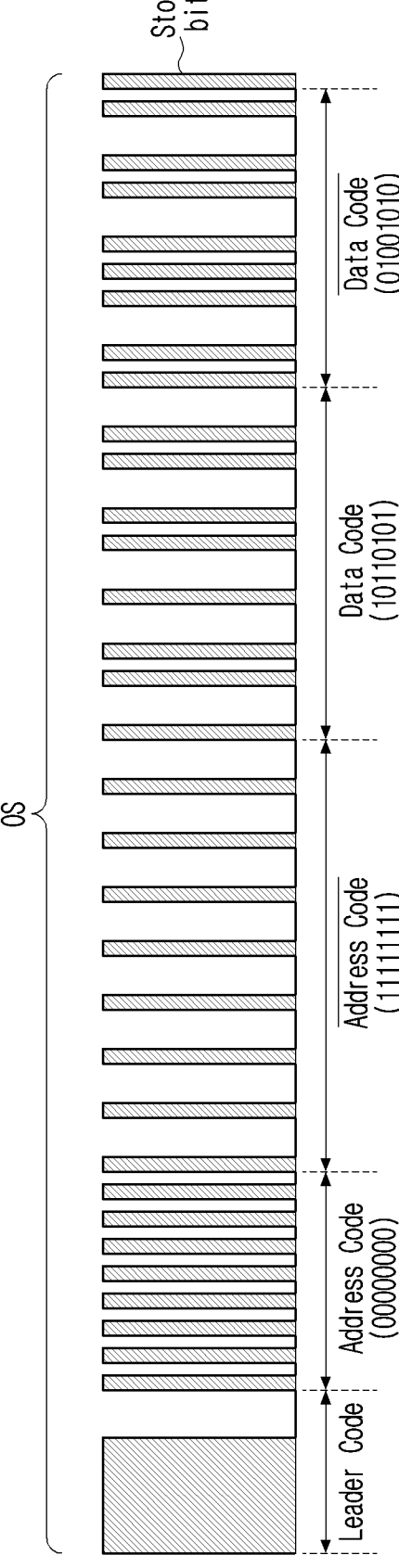
FIG. 5A and FIG. 5B are diagrams for illustrating a protocol of a third radio signal according to an embodiment of the disclosure.

As in FIG. 5A, the third radio signal OS may include a reader code, an address code, an address inversion code, a data code, and a data inversion code based on the NEC protocol. Here, the reader code may be a code for identifying the start of a data frame of a radio signal. Also, the inversion code may be a code for checking an error of an address code or a data code.

In this case, the address code, the address inversion code, the data code, and the data inversion code may include a plurality of bits having a value of 0 or 1 based on the NEC protocol. Also, the third radio signal OS may include a stop bit for identifying a point wherein the signal ends.

The NEC protocol used for outputting the third radio signal OS may express a value of 0 or 1 of a bit based on a pulse signal of a predetermined length constituting the radio signal and the length of the time during which a signal does not exist after the pulse signal ends.

Figure 5B:
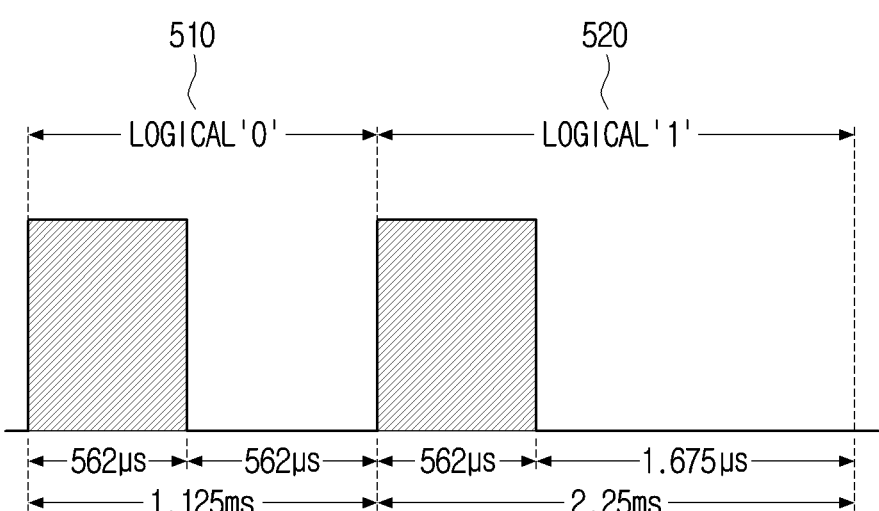

Referring to FIG. 5B, in the NEC protocol, the pulse signal of 562.5 us and the signal of the section wherein a signal does not exist during 562.5 us after the pulse signal ends may be a signal 510 having a bit value of 0. Accordingly, the NEC protocol may need a signal having a length of 1.125 ms in total to express the bit having a value of 0.

Also, referring to FIG. 5B, in the NEC protocol, the signal of the section wherein a signal does not exist during 1.6875 us after the pulse signal of 562.5 us ends may be a signal 520 having a bit value of 1. Accordingly, the NEC protocol may need a signal having a length of 2.25 ms in total to express the bit having a value of 1.

In contrast, in the protocol used for outputting the plurality of second radio signals CS1, CS2, CS3, . . . , CSn, the length of a signal necessary for expressing a bit having a value of 0 or 1 may be shorter than in the NEC protocol.

Figure 6A:
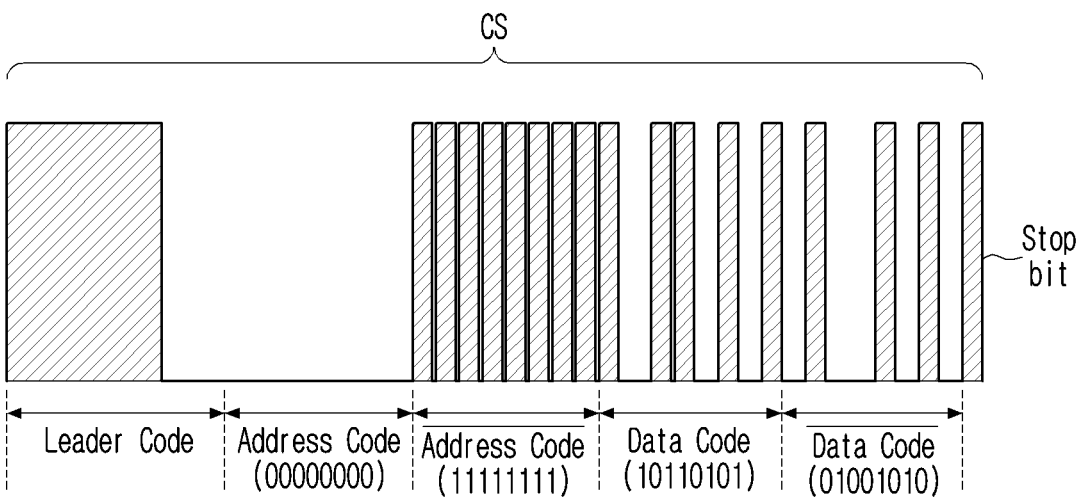
FIG. 6A and FIG. 6B are diagrams for illustrating a protocol of a second radio signal according to an embodiment of the disclosure.

For example, as in FIG. 6A, even if one second radio signal CS among the plurality of second radio signals CS1, CS2, CS3, . . . , CSn includes a reader code, an address code, an address inversion code, a data code, and a data inversion code having the same roles and the same bit values as the third radio signal OS, its total length may be shorter than the third radio signal OS.

For this, the protocol used for outputting the second radio signal CS may express a bit value of 1 just with a pulse signal of the predetermined length, and may express a bit value of 0 with a section of the predetermined length wherein a signal does not exist.

Figure 6B:
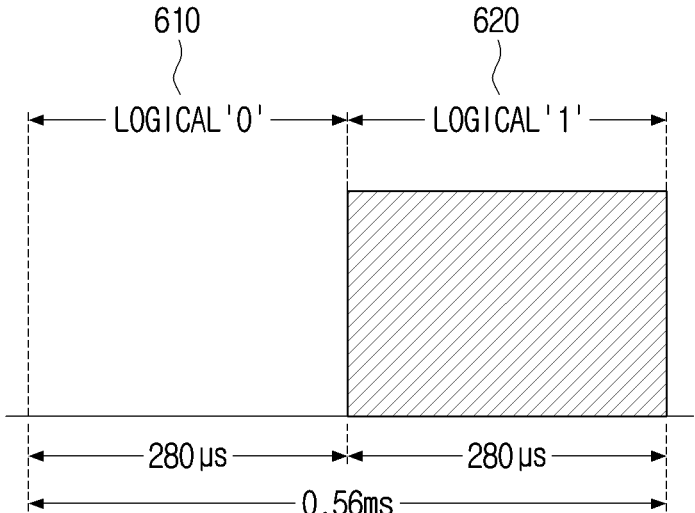

As in FIG. 6B, in the protocol used for outputting the second radio signal CS, a signal of the section wherein 280 us exists may be a signal 610 having a bit value of 1, and a signal of the section wherein a signal does not exist during 280 us may be a signal 620 having a bit value of 0. Like this, the protocol used for outputting the second radio signal CS may need a signal of 280 us to express a bit value of 0 or 1.

As can be seen above, the remote control device 100 according to an embodiment of the disclosure may output the second radio signal corresponding to an input key that was consecutively selected such that the signal has a shorter length than the length of the third radio signal corresponding to an input key that was selected only once or was initially selected. Accordingly, when an input key was consecutively selected, the external electronic device 300 can be controlled at a faster speed than in the case of repeatedly outputting the third radio signal.

According to an embodiment of the disclosure, the carrier frequency of the second radio signal may be different from the carrier frequency of the first radio signal.

The processor 130 may control the signal transmitter 120 to output the second radio signal modified to a carrier frequency different from the carrier frequency of the first radio signal.

For this, the memory of the remote control device 100 may store information on the carrier frequency of the first radio signal. In this case, the information on the carrier frequency of the first radio signal may be stored based on information received from the electronic device 200 or a user input. Accordingly, the processor 130 may control the signal transmitter 120 to output the second radio signal modified to a carrier frequency different from the carrier frequency of the first radio signal based on the information stored in the memory.

The external electronic device 300 may receive only a radio signal having the carrier frequency of the first radio signal, and block a radio signal having the carrier frequency of the second radio signal.

The external electronic device 300 may perform signal processing for radio signals received through the signal transmitter by using a band pass filter wherein the carrier frequency of the first radio signal is included in the pass band, and the carrier frequency of the second radio signal is included in the block band.

Accordingly, even when the first radio signal and the second radio signal are output together, the external electronic device 300 may not receive the second radio signal, but may be able to receive only the first radio signal.

As can be seen above, according to an embodiment of the disclosure, the external electronic device 300 may receive only the first radio signal regardless of an output of the second radio signal and perform a function based on the first radio signal. Thus, even if an input key of the remote control device 100 is consecutively selected, the external electronic device 300 can perform a function corresponding to the selected input key swiftly and accurately.

According to an embodiment of the disclosure, if one of the plurality of input keys is consecutively selected, the processor 130 may control the signal transmitter 120 to output a third radio signal corresponding to the selected input key, and output a second radio signal after a predetermined time period from the time point when the third radio signal was output, and repeatedly output the second radio signal according to the identified time interval.

If a user input selecting one of the plurality of input keys 110 is detected, the processor 130 may control the transmitter 120 to output a third radio signal corresponding to the selected input key.

Then, in case the user input selecting the selected input key lasts for greater than or equal to a predetermined time, the processor 130 may identify that the input key was consecutively selected, and repeatedly output the second radio signal corresponding to the selected input key.

Here, in case the external electronic device 300 receives the third radio signal, the external electronic device 300 may store information on the received third radio signal in the memory, and if it is identified that the device to be controlled by the third radio signal is not the external electronic device 300 based on the address code included in the stored third radio signal, the external electronic device 300 may delete information on the third radio signal stored in the memory.

As can be seen above, a specific time is spent for the external electronic device 300 to perform signal processing for the third radio signal, and during this time, the external electronic device 300 cannot perform signal processing for other radio signals received at the That is, in order that the external electronic device 300 can perform a function based on the first radio signal correctly, there is a need to prevent reception of the first radio signal while signal processing for the third radio signal is being performed.

Accordingly, the processor 130 may control the signal transmitter 120 to output the second radio signal after the predetermined time interval from the time point when the third radio signal was output, but not output the second radio signal right after outputting the third radio signal, and repeatedly output the second radio signal according to the identified time interval.

As can be seen above, according to an embodiment of the disclosure, the electronic device 200 may transmit the first radio signal to the external electronic device 300 based on the second radio signal that is output after the predetermined time interval from the time point when the third radio signal was output. Accordingly, the external electronic device 300 can receive the first radio signal after performing signal processing for the third radio signal, and can thereby perform the function corresponding to the first radio signal more correctly.

Figure 7:
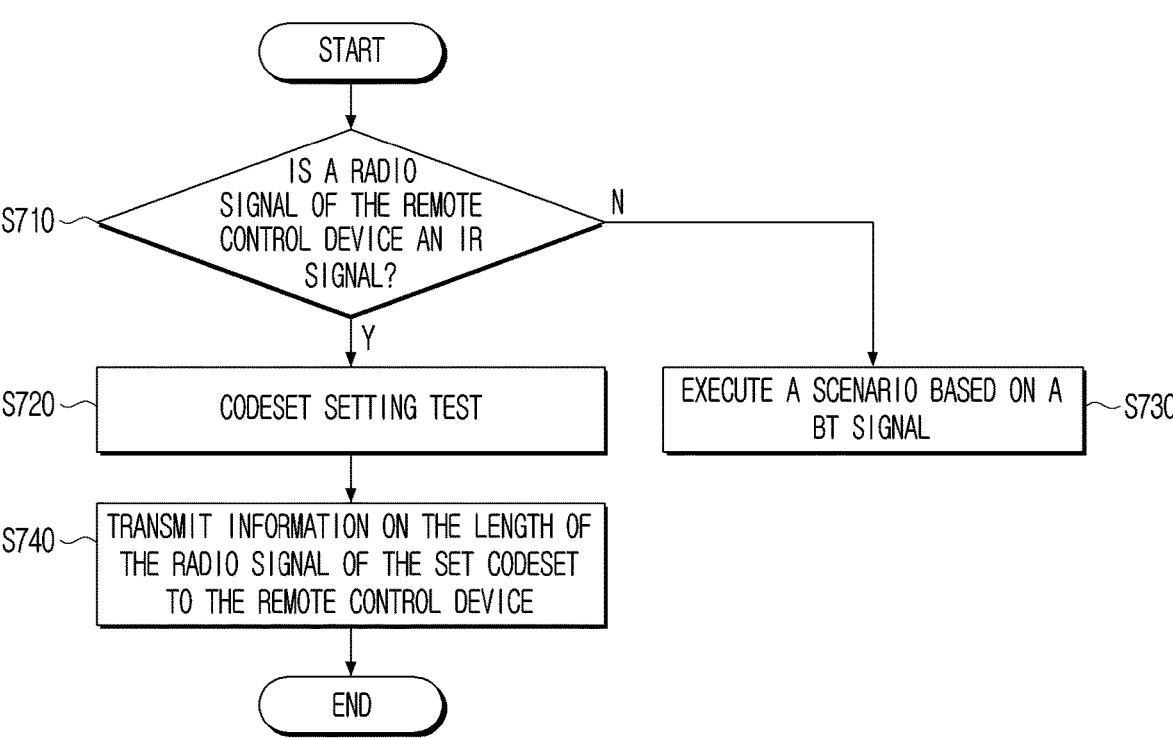
FIG. 7 is a flow chart for illustrating a method for a remote control device to receive information on the length of a second radio signal from an electronic device according to an embodiment of the disclosure.

FIG. 7 is a flow chart for illustrating a method for a remote control device to receive information on the length of a second radio signal from an electronic device according to an embodiment of the disclosure.

First, the electronic device 200 may identify whether a radio signal transmitted by the remote control device 100 is an infrared radio signal in operation S710.

If the electronic device 200 receives an infrared radio signal from the remote control device 100 through the signal receiver, the electronic device 200 may identify that the radio signal transmitted by the remote control device 100 is an infrared radio signal. As a detailed content regarding transmission of an infrared radio signal by the remote control device 100 was described above, the content will be omitted.

Also, the remote control device 100 according to an embodiment of the disclosure may include a communication interface for performing communication with an external device. As an example, the communication interface may be a Bluetooth module for performing Bluetooth communication. Accordingly, the remote control device 100 may control the communication interface to transmit a radio signal corresponding to a selected input key among the plurality of input keys 110 to the electronic device 200. Then, when the radio signal is received from the remote control device 100 through the communication interface, the electronic device 200 may identify that the radio signal transmitted by the remote control device 100 is not an infrared radio signal.

Then, if it is identified that the radio signal transmitted by the remote control device 100 is an infrared radio signal in operation S710-Y, the electronic device 200 may perform a code set setting test in operation S720.

Here, the code set setting test may mean a process for setting a code set of a radio signal that the electronic device 200 transmits to the external electronic device 300 for controlling the external electronic device 300. A code set may mean a data set including address codes and data codes corresponding to each function that the external electronic device 300 can perform. That is, the electronic device 200 may transmit a radio signal including an address code and a data code corresponding to a specific function to the external electronic device 300 such that the external electronic device 300 performs the function based on a code set.

As the code sets may vary for each external electronic device 300, it is necessary for the electronic device 200 to identify the code set of the external electronic device 300.

For this, the electronic device 200 may transmit radio signals based on each of the plurality of code sets to the external electronic device 300. Then, in case the external electronic device 300 performs a function for a radio signal based on a specific code set, the electronic device 200 may identify that the code set is the code set of the external electronic device 300. Then, the electronic device 200 may set the identified code set as the code set of the external electronic device 300, and afterwards, transmit a radio signal transmitted to the external electronic device 300 as a radio signal based on the set code set.

Then, the electronic device 200 may transmit information on the length of the radio signal based on the set code set to the remote control device 100. Accordingly, the remote control device 100 may receive the information on the length of the radio signal for controlling the external electronic device 300 from the electronic device 200.

If the electronic device 200 identifies that the radio signal transmitted from the remote control device 100 is not an infrared radio signal in operation S710-N, the electronic device 200 may perform a function according to a scenario based on a Bluetooth signal.

As the radio signal transmitted by the remote control device 100 is a Bluetooth signal, and the signal transmitted to the external electronic device 300 by the electronic device 200 is an infrared signal, an interference phenomenon between the two signals may not occur.

That is, if one of the plurality of input keys 110 is consecutively selected, the remote control device 100 may not need to identify the time interval among the second radio signals based on the information on the length of the first radio signal, and control the signal transmitter 120 to repeatedly output the second radio signal corresponding to the selected input key based on the identified time interval. Thus, the electronic device 200 may not transmit the information on the length of the radio signal of the set code that is set to the remote control device 100 to the remote control device 100.

Figure 8:
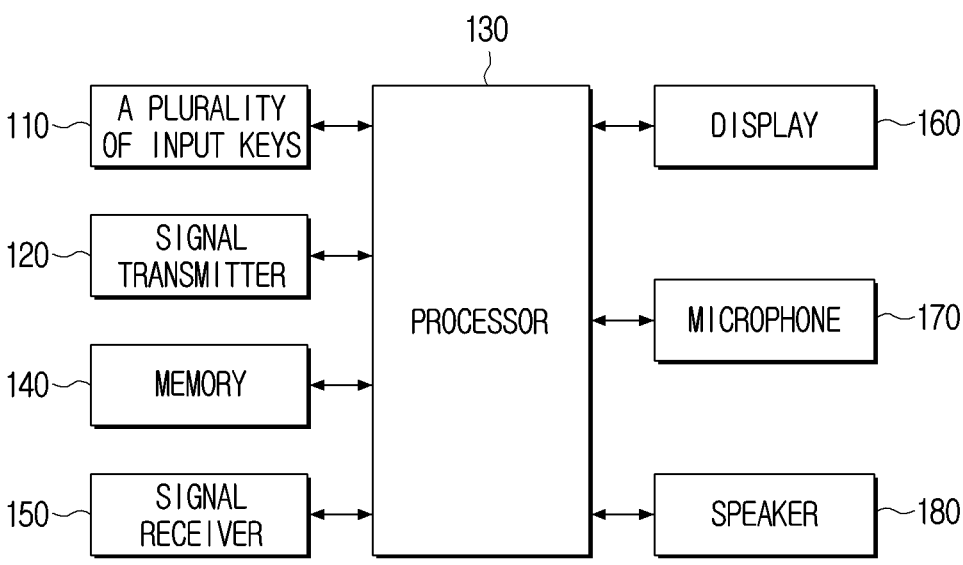
FIG. 8 is a block diagram for illustrating a detailed configuration of a remote control device according to an embodiment of the disclosure.

FIG. 8 is a block diagram for illustrating a detailed configuration of a remote control device according to an embodiment of the disclosure.

Referring to FIG. 8, the remote control device 100 may include a plurality of input keys 110, a signal transmitter 120, a processor 130, a memory 140, a signal receiver 150, a display 160, a microphone 170, and a speaker 180. The components illustrated in FIG. 8 are merely an example, and it is obvious that at least some components can be omitted, or other components can be added depending on embodiments.

Also, as the plurality of input keys 110, the signal transmitter 120, and the processor 130 were explained in FIG. 1 to FIG. 6A and FIG. 6B, detailed explanation regarding overlapping parts will be omitted.

The memory 140 may store various instructions, programs, or data related to the operations of the remote control device 100. For this, the memory 140 may include a semiconductor memory such as volatile memory, a flash memory, etc. or a magnetic storage medium such as a hard disk, etc.

For example, the memory 140 may include an address code indicating that the device to be controlled is the electronic device 200 and data codes indicating information regarding each of the plurality of input keys 110. Accordingly, if a user input selecting one of the plurality of input keys 110 is detected, the processor 130 may control the signal transmitter 120 to output a radio signal including an address code indicating that the subject device is the electronic device 200 and a data code indicating the information regarding the selected input key based on the information stored in the memory 140.

The signal receiver 150 is a component for transmitting a radio signal from an external device. For example, the processor 130 may receive information on the length of the first radio signal from the electronic device 200 through the signal receiver 150, and store the information in the memory 140.

For this, the signal receiver 150 may be implemented as communication circuitry consisting of at least one electronic element that detects an infrared light of a specific wavelength and generates an electric signal. As an example, the signal receiver 150 may include an IR photodiode.

The display 160 is a component that can display various screens. For example, if a user input selecting one of the plurality of input keys 110 is detected, the processor 130 may control the display 160 to display a UI indicating information on the selected input key. For this, the display 160 may be implemented as displays in various types such as an LCD, LEDs, or OLEDs, etc.

The microphone 170 is a component for receiving various voice signals. For example, the processor 130 may receive the user's voice through the microphone, and identify a user instruction selecting one of the plurality of input keys 110 based on the received user's voice. Then, the processor 130 may control the signal transmitter 120 to output a radio signal corresponding to the selected input key.

The speaker 180 is a component that can output various sounds. For example, if a user input selecting one of the plurality of input keys 110 is detected, the processor 130 may control the speaker 180 to output a sound indicating information on the selected input key.

Figure 9:
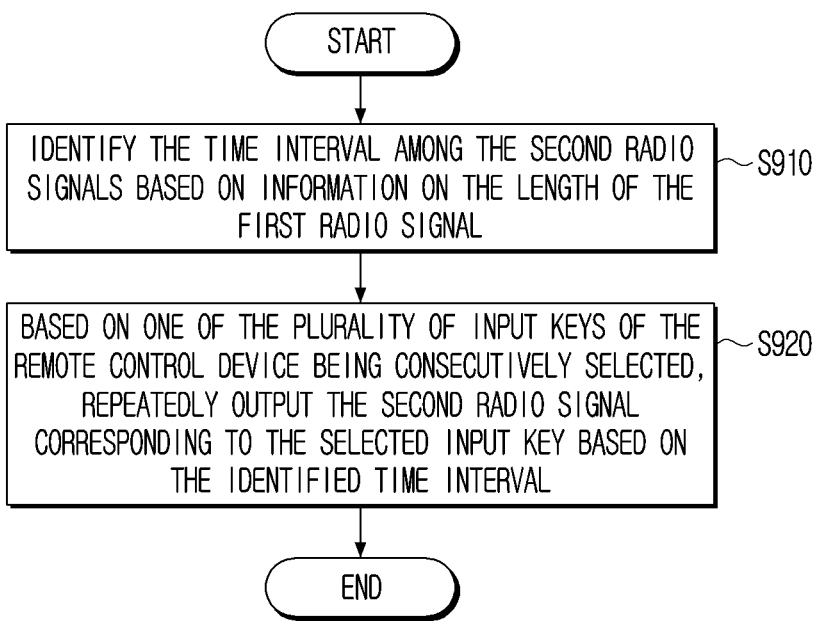
FIG. 9 is a flow chart for illustrating a control method of a remote control device according to an embodiment of the disclosure.

FIG. 9 is a flow chart for illustrating a control method of a remote control device according to an embodiment of the disclosure.

First, the time interval among the second radio signals is identified based on information on the length of the first radio signal in operation S910.

Then, if one of the plurality of input keys of the remote control device is consecutively selected, the second radio signal corresponding to the selected input key is repeatedly output based on the identified time interval in operation S920.

In this case, the first radio signal may be a radio signal that is used for the electronic device to control the external electronic device performing communication with the electronic device based on the second radio signal received from the remote control device.

The identified time interval may be longer than the length of the first radio signal.

Also, in the operation S820, if one of the plurality of input keys is consecutively selected, a third radio signal corresponding to the selected input key may be output, and the second radio signal corresponding to the selected input key may be repeatedly output based on the identified time interval.

In this case, in the operation S820, the third radio signal including input key data corresponding to the selected input key may be output based on the first protocol, and the second radio signal including input key data corresponding to the selected input key may be output based on the second protocol.

Also, the length of the radio signal corresponding to one bit constituting the input key data in the second protocol may be shorter than the length of the radio signal corresponding to one bit constituting the input key data in the first protocol.

In the operation S820, if one of the plurality of input keys is consecutively selected, the third radio signal corresponding to the selected input key may be output, and the second radio signal may be output after a predetermined time interval from the time point when the third radio signal was output, and the second radio signal may be repeatedly output according to the identified time interval.

Also, the carrier frequency of the second radio signal may be different from the carrier frequency of the first radio signal.

In addition, the control method may further include the step of receiving information on the length of the first radio signal.

A content regarding a specific method of identifying the time interval among the second radio signals based on the information on the length of the first radio signal, and if one of the plurality of input keys of the remote control device is consecutively selected, repeatedly outputting the second radio signal corresponding to the selected input key based on the identified time interval was described above.

According to an embodiment of the disclosure, the aforementioned various embodiments may be implemented as software including instructions stored in machine-readable storage media, which can be read by machines (e.g.: computers). The machines refer to devices that call instructions stored in a storage medium, and can operate according to the called instructions, and the devices may include a device according to the embodiments disclosed herein. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily. For example, 'a non-transitory storage medium' may include a buffer wherein data is temporarily stored.

Also, according to an embodiment of the disclosure, the methods according to the various embodiments disclosed herein may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or distributed directly on-line (e.g.: download or upload) through an application store (e.g.: Play Store™), or between two user devices (e.g.: smartphones). In the case of on-line distribution, at least a portion of a computer program product (e.g.: a downloadable app) may be stored in a storage medium readable by machines such as the server of the manufacturer, the server of the application store, and the memory of the relay server at least temporarily, or may be generated temporarily.

The above-described embodiments are merely specific examples to describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. A remote control device configured to control an electronic device comprising:
a plurality of input keys;
a signal transmitter; and
a processor configured to:
identify a time interval between a first radio signal and a second radio signal based on a length of the first radio signal, and
based on one of the plurality of input keys being consecutively selected, control the signal transmitter to repeatedly output the second radio signal corresponding to the selected input key according to the identified time interval,
wherein the first radio signal is configured to control an external electronic device communicating with the electronic device based on the second radio signal received from the remote control device.

2. The remote control device of claim 1,
wherein the identified time interval is longer than the length of the first radio signal.

3. The remote control device of claim 1,
wherein the processor is further configured to:
based on the one of the plurality of input keys being consecutively selected, control the signal transmitter to output a third radio signal corresponding to the selected input key, and then repeatedly output the second radio signal corresponding to the selected input key based on the identified time interval.

4. The remote control device of claim 3,
wherein the processor is further configured to:
control the signal transmitter to output the third radio signal including input key data corresponding to the selected input key based on a first protocol, and then output the second radio signal including input key data corresponding to the selected input key based on a second protocol.

5. The remote control device of claim 4,
wherein a length of a radio signal corresponding to a bit constituting the input key data in the second protocol is shorter than a length of a radio signal corresponding to the bit constituting the input key data in the first protocol.

6. The remote control device of claim 3,
wherein the processor is further configured to:
based on the one of the plurality of input keys being consecutively selected, control the signal transmitter to output the third radio signal corresponding to the selected input key, output the second radio signal after a predetermined time interval from when the third radio signal was output, and repeatedly output the second radio signal according to the identified time interval.

7. The remote control device of claim 1,
wherein a carrier frequency of the second radio signal is different from a carrier frequency of the first radio signal.

8. The remote control device of claim 1, further comprising:
a signal receiver,
wherein the processor is further configured to:
receive information on the length of the first radio signal through the signal receiver.

9. A control method of a remote control device controlling an electronic device, the method comprising:
identifying a time interval between a first radio signal and a second radio signal based on a length of the first radio signal; and
based on one of a plurality of input keys of the remote control device being consecutively selected, repeatedly outputting the second radio signal corresponding to the selected input key according to the identified time interval,
wherein the first radio signal is configured to control an external electronic device based on the second radio signal received from the remote control device.

10. The control method of claim 9,
wherein the identified time interval is longer than the length of the first radio signal.

11. The control method of claim 9,
wherein the repeatedly outputting the second radio signal comprises:
based on the one of the plurality of input keys being consecutively selected, outputting a third radio signal corresponding to the selected input key, and then repeatedly outputting the second radio signal corresponding to the selected input key based on the identified time interval.

12. The control method of claim 11,
wherein the repeatedly outputting the second radio signal further comprises:
outputting the third radio signal including input key data corresponding to the selected input key based on a first protocol, and then outputting the second radio signal including input key data corresponding to the selected input key based on a second protocol.

13. The control method of claim 12,
wherein a length of a radio signal corresponding to a bit constituting the input key data in the second protocol is shorter than a length of a radio signal corresponding to the bit constituting the input key data in the first protocol.

14. The control method of claim 11, wherein the repeatedly outputting the second radio signal further comprises:

based on the one of the plurality of input keys being consecutively selected, outputting the third radio signal corresponding to the selected input key, outputting the second radio signal after a predetermined time interval from when the third radio signal was output, and then repeatedly outputting the second radio signal according to the identified time interval.

15. The control method of claim 9, wherein a carrier frequency of the second radio signal is different from a carrier frequency of the first radio signal.

16. A non-transitory computer-readable medium configured to store computer instructions for a remote control device controlling an electronic device to perform an operation when executed by a processor of the remote control device, the operation comprising:

identifying a time interval between a first radio signal and a second radio signal based on a length of the first radio signal; and based on one of a plurality of input keys of the remote control device being consecutively selected, repeatedly outputting the second radio signal corresponding to the selected input key according to the identified time interval, wherein the first radio signal is configured to control an external electronic device based on the second radio signal received from the remote control device.

17. The non-transitory computer-readable medium of claim 16, wherein the identified time interval is longer than the length of the first radio signal.

18. The non-transitory computer-readable medium of claim 16, wherein the repeatedly outputting the second radio signal comprises:

based on the one of the plurality of input keys being consecutively selected, outputting a third radio signal corresponding to the selected input key, and then repeatedly outputting the second radio signal corresponding to the selected input key based on the identified time interval.

19. The non-transitory computer-readable medium of claim 18, wherein the repeatedly outputting the second radio signal further comprises:

outputting the third radio signal including input key data corresponding to the selected input key based on a first protocol, and then outputting the second radio signal including input key data corresponding to the selected input key based on a second protocol.

20. The non-transitory computer-readable medium of claim 19, wherein a length of a radio signal corresponding to a bit constituting the input key data in the second protocol is shorter than a length of a radio signal corresponding to the bit constituting the input key data in the first protocol.

\* \* \* \* \*